J. H. ROSE.
Seed Planter.
No. 21,217.
Patented Aug. 17, 1858.
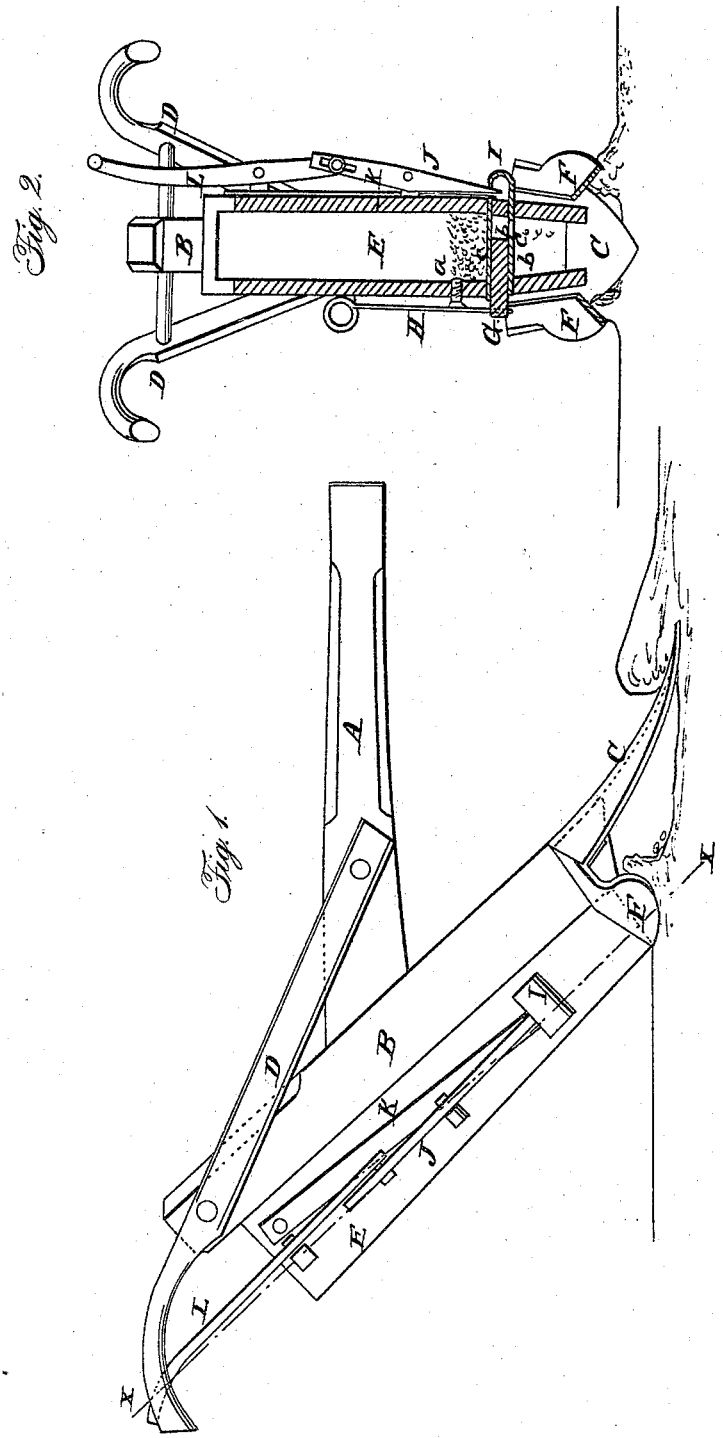

UNITED STATES PATENT OFFICE.

JONATHAN H. ROSE, OF VERSAILLES, ILLINOIS.

IMPROVEMENT IN SEED-PLANTERS.

Specification forming part of Letters Patent No. 21,217, dated August 17, 1858.

*To all whom it may concern:*

Be it known that I, JNO. H. ROSE, of Versailles, in the county of Brown and State of Illinois, have invented a new and Improved Seeding-Machine; and I do hereby declare that the following is a full, clear, and exact description of the same, reference being had to the annexed drawings, making a part of this specification, in which—

Figure 1 is a side view of my invention. Fig. 2 is a section of the same, taken in the line $x\,x$, Fig. 1.

Similar letters of reference indicate corresponding parts in the two figures.

This invention consists in a novel arrangement and adaptation of a seed-distributing device to a plow, as hereinafter fully shown and described, whereby the operator or attendant, while guiding or holding the plow, may actuate at will and with facility the seed-distributing device, the same, owing to its peculiar construction, being capable of ready adjustment, so that the discharge of seed may be regulated as occasion may require.

To enable those skilled in the art to fully understand and construct my invention, I will proceed to describe it.

A represents a plow-beam; B, an inclined bar attached to the back end of beam A, and having a shovel-share, C, attached to its lower end. D D are handles attached to the beam and bar. The above parts constitute substantially the usual and well-known shovel-plow, and therefore a more minute description of them would be unnecessary.

To the back of the bar B a box, E, is attached. This box is nearly equal in length to the bar B, extends down a trifle below it and between oblique or diagonal flanges F F, which are directly behind the share C and serve as covering-shares, as hereinafter described.

G is a rectangular slide-bar, which passes horizontally into one side of the box E, and has its outer end attached to a spring, H, which has a tendency to keep the bar G within the box, the spring H being secured to the outer side of the box and the position of bar G regulated by a set-screw, $a$, against which the spring H bears.

I is a bent or bowed seed-slide, which is formed of a metal plate bent so as to form the parallel strips $b\,b$, between which the bar G is snugly fitted, the strips $b$ being allowed to slide over bar G. The strips $b\,b$ have apertures $c$ made through them, one through each. These apertures, however, do not register with each other. They are placed sufficiently out of line to allow the bar G to cut off the communication between them. (See Fig. 2.) The outer end of the seed-slide I is attached to a lever, J, which is pivoted to the outer side of the box E, as shown at $d$. A spring, K, which is attached to the outer side of this box, has its lower end fitted in the slide I, and the upper end of lever J is pivoted to a lever, L, the upper end of which is in close proximity to one of the handles. The spring K has a tendency to keep the seed-slide I within the box E.

The operation will be readily seen. The box E is filled with seed, and as the implement is drawn along the operator guides it by grasping the handles D D. The share C forms the furrows, and seed is dropped at any time at the will of the operator by actuating the lever L, and consequently the slide I. The operation of the seed-slide is as follows: When the slide I is thrown inward the opening $c$ of the upper strip $b$ of slide I will be over the bar G, while the opening $c$ of the lower strip $b$ will be open. (See Fig. 2.) The reverse is the case when the slide I is forced outward. The opening $c$ in the upper strip $b$ is off from the bar G and the lower opening $c$ within the side of box E. It will be seen, therefore, that the space between the two strips $b\,b$ of slide I forms a seed receptacle or chamber, into which and from which the seed is alternately received and discharged; and it will also be seen that by adjusting the bar G by means of the screw $a$ the amount of seed discharged at each movement of the seed-slide I may be regulated as desired, for the bar G may be so adjusted as to expose the whole or a portion only of the openings $c$. The seed is dropped into the furrow formed by the share C and the seed is covered by the shares F F.

The seed distributing device, arranged and adapted to the plow as shown, forms a very simple and efficient implement, one that may be cheaply constructed, readily kept in repair, and well adapted for the planting of all seeds that are deposited in hills; and it may be regulated with the greatest facility as regards the amount of seed to be distributed in a hill or at each dropping.

I do not claim broadly the parts pertaining to the shovel-plow, nor do I claim the covering-shares F F. Neither do I claim broadly the employment of an adjustable slide to regulate the amount of seed to be planted at each dropping, for slides have been arranged in various ways for such purpose. I am not aware, however, that a seed-slide and adjusting-bar have been arranged, as herein shown, so as to form the exceedingly simple device described— to wit, a supplemental seed-chamber and adjustable seed-slide combined.

I claim, therefore, as new and desire to secure by Letters Patent—

The seed-distributing device formed of the slide I, bent or bowed as shown, and the adjustable bar G, fitted in the seed-box E, the whole being arranged and connected with the plow for joint operation substantially as and for the purpose set forth.

JONATHAN H. ROSE.

Witnesses:
R. A. GLENN,
A. A. GLENN.